United States Patent
Goel et al.

(10) Patent No.: US 10,161,662 B2
(45) Date of Patent: Dec. 25, 2018

(54) METHOD AND APPARATUS FOR REHEAT DEHUMIDIFICATION WITH VARIABLE SPEED OUTDOOR FAN

(71) Applicant: Lennox Industries LLC, Richardson, TX (US)

(72) Inventors: Rakesh Goel, Carrollton, TX (US); Eric Berg, Carrollton, TX (US)

(73) Assignee: Lennox Industries LLC, Richardson, TX (US)

( * ) Notice: Subject to any disclaimer, the term of this patent is extended or adjusted under 35 U.S.C. 154(b) by 49 days.

(21) Appl. No.: 14/954,558

(22) Filed: Nov. 30, 2015

(65) Prior Publication Data

US 2017/0153052 A1    Jun. 1, 2017

(51) Int. Cl.
 *F25B 1/00*   (2006.01)
 *F25B 49/02*  (2006.01)

(52) U.S. Cl.
 CPC ...... *F25B 49/027* (2013.01); *F25B 2400/077* (2013.01)

(58) Field of Classification Search
 CPC .... F25B 49/002; F25B 49/02; F25B 2600/11; F25B 2600/111; F25B 2700/172; F25B 2313/0294; Y02B 40/32; Y02B 30/746
 USPC ................. 62/115, 215, 226, 228.1, 229
 See application file for complete search history.

(56) References Cited

U.S. PATENT DOCUMENTS

| | | | |
|---|---|---|---|
| 4,408,713 A | 10/1983 | Iijima et al. | |
| 4,744,223 A | 5/1988 | Umezu | |
| 4,813,474 A | 3/1989 | Umezu | |
| 4,873,649 A | 10/1989 | Grald et al. | |
| 5,062,276 A * | 11/1991 | Dudley | F24F 11/00 62/176.6 |
| 5,095,715 A | 3/1992 | Dudley | |
| 5,481,166 A | 1/1996 | Moreira | |
| 5,832,744 A | 11/1998 | Dorste et al. | |
| 6,055,819 A | 5/2000 | Kang | |
| 6,070,110 A | 5/2000 | Shah et al. | |

(Continued)

FOREIGN PATENT DOCUMENTS

| | | |
|---|---|---|
| AU | 2011100169 A4 | 3/2011 |
| CA | 2775540 A1 | 11/2012 |

(Continued)

OTHER PUBLICATIONS

U.S. Appl. No. 14/706,535, Goel.

(Continued)

*Primary Examiner* — Joseph Trpisovsky
(74) *Attorney, Agent, or Firm* — Winstead PC (57) ABSTRACT

An HVAC system includes an indoor unit having a return air duct and a supply air duct in an enclosed space. The HVAC system includes an outdoor unit having a variable-speed condenser fan. A first temperature sensor is disposed in at least one of the return air duct, the supply air duct, or an enclosed space. A controller is operatively coupled to the first temperature sensor, and the variable-speed condenser fan. The controller is configured to determine whether at least one of over-cooling or over-heating of air in the enclosed space is occurring. Responsive to a determination that at least one of over-cooling or over-heating of air in the enclosed space is occurring, the controller adjusts a speed of the variable-speed condenser fan.

16 Claims, 5 Drawing Sheets

(56) References Cited

U.S. PATENT DOCUMENTS

| | | |
|---|---|---|
| 6,427,454 B1 | 8/2002 | West |
| 6,789,881 B2 | 9/2004 | Silverbrook |
| 6,792,767 B1 | 9/2004 | Pargeter et al. |
| 6,826,921 B1 | 12/2004 | Uselton |
| 7,770,405 B1 | 8/2010 | Dillon |
| 8,397,522 B2 | 3/2013 | Springer et al. |
| 8,689,582 B2 | 4/2014 | Birkelund et al. |
| 8,948,918 B2 | 2/2015 | Chamorro et al. |
| 2005/0056042 A1 | 3/2005 | Bourne et al. |
| 2005/0241325 A1 | 11/2005 | Olney |
| 2005/0278071 A1 | 12/2005 | Durham |
| 2008/0098756 A1* | 5/2008 | Uselton .................. F24F 3/153 62/173 |
| 2008/0245083 A1 | 10/2008 | Tutunoglu et al. |
| 2008/0307803 A1 | 12/2008 | Herzon |
| 2009/0192650 A1 | 7/2009 | Tonner |
| 2009/0205354 A1 | 8/2009 | Brown |
| 2009/0277193 A1 | 11/2009 | Springer et al. |
| 2010/0082161 A1 | 4/2010 | Patch |
| 2010/0082162 A1 | 4/2010 | Mundy et al. |
| 2010/0307733 A1 | 12/2010 | Karamanos et al. |
| 2011/0083454 A1* | 4/2011 | Kopko .................. F25B 49/027 62/115 |
| 2011/0208325 A1 | 8/2011 | Liu |
| 2012/0137713 A1* | 6/2012 | Duraisamy ............... B60P 3/20 62/228.1 |
| 2012/0303165 A1 | 11/2012 | Qu et al. |
| 2012/0318007 A1* | 12/2012 | Lukasse .................. F25B 49/02 62/89 |
| 2013/0061619 A1 | 3/2013 | Saitou et al. |
| 2013/0213064 A1 | 8/2013 | Gomes et al. |
| 2013/0255297 A1 | 10/2013 | Matsuoka et al. |
| 2014/0131009 A1 | 5/2014 | Zhou et al. |
| 2014/0245762 A1 | 9/2014 | Schlesinger |
| 2014/0345307 A1 | 11/2014 | Bagley et al. |
| 2014/0360211 A1 | 12/2014 | Hovel et al. |
| 2015/0021005 A1 | 1/2015 | Land, III |
| 2015/0075766 A1 | 3/2015 | Alston |
| 2015/0323423 A1 | 11/2015 | Alsaleem |
| 2015/0337831 A1 | 11/2015 | Zhou et al. |
| 2016/0273815 A1 | 9/2016 | Downie et al. |

FOREIGN PATENT DOCUMENTS

| | | |
|---|---|---|
| WO | WO-8912269 A1 | 12/1989 |
| WO | WO-97/32167 A1 | 9/1997 |

OTHER PUBLICATIONS

U.S. Appl. No. 14/954,531, Goel et al.
U.S. Appl. No. 15/044,243, Goel et al.
U.S. Appl. No. 15/177,639, Goel.
U.S. Appl. No. 15/177,585, Goel.
Research and Development Roadmap for Emerging HVAC Technologies—Goetzier et al. (Oct. 2014).

* cited by examiner

METHOD AND APPARATUS FOR REHEAT DEHUMIDIFICATION WITH VARIABLE SPEED OUTDOOR FAN

CROSS REFERENCE TO RELATED APPLICATIONS

This patent application incorporates by reference for any purpose the entire disclosure of the U.S. patent application Ser. No. 14/954,531 titled METHOD AND APPARATUS FOR REHEAT DEHUMIDIFICATION WITH VARIABLE AIR VOLUME.

TECHNICAL FIELD

The present invention relates generally to heating, ventilation, and air conditioning (HVAC) systems and, more particularly, but not by way of limitation, to modulating blower speed to maximize latent capacity of an HVAC system.

BACKGROUND

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying, or dehumidifying the air). To direct operation of the circulation fan and other components, HVAC systems include a controller. In addition to directing operation of the HVAC system, the controller may be used to monitor various components (i.e., equipment) of the HVAC system to determine if the components are functioning properly.

SUMMARY

A heating, ventilation, and air conditioning (HVAC) system that includes an indoor unit having a return air duct and a supply air duct in an enclosed space. The HVAC system further includes an outdoor unit having a variable-speed condenser fan. A first temperature sensor is disposed in at least one of the return air duct, the supply air duct, or an enclosed space. A controller is operatively coupled to the first temperature sensor, and the variable-speed condenser fan. The controller is configured to determine whether at least one of over-cooling or over-heating of air in the enclosed space is occurring. Responsive to a determination that at least one of over-cooling or over-heating of air in the enclosed space is occurring, the controller adjusts a speed of the variable-speed condenser fan.

A method that includes receiving, by a controller associated with a heating, ventilation, and air conditioning (HVAC) system, at least one of an air temperature in a return air duct, an air temperature in a supply air duct, and an air temperature in an enclosed space. The method also includes determining, via the a controller, if at least one of over-cooling or over-heating of air in the enclosed space is occurring. Responsive to a determination that at least one of over-cooling or over-heating of air in the enclosed space is occurring, adjusting, via the controller, a speed of a variable-speed condenser fan of the HVAC system. The adjusting the speed of the variable-speed condenser fan alters a conditioned-air discharge temperature of the HVAC system.

A heating, ventilation, and air conditioning (HVAC) system that includes an indoor unit having a return air duct and a supply air duct in an enclosed space. The HVAC system further includes an outdoor unit having a variable-speed condenser fan. A first temperature sensor is disposed in at least one of the return air duct, the supply air duct, or an enclosed space. A controller is operatively coupled to the first temperature sensor, and the variable-speed condenser fan. The controller is configured to determine whether at least one of over-cooling or over-heating of air in the enclosed space is occurring. Responsive to a determination that at least one of over-cooling or over-heating of air in the enclosed space is occurring, the controller adjusts a speed of the variable-speed condenser fan. Adjustment of the speed of the variable-speed condenser fan maintains an S/T ratio of the HVAC system in a range of approximately −0.1 to approximately 0.1. The S/T ratio is a ratio of sensible heat removed from the enclosed space to total heat removed from the enclosed space

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Various embodiments of the present invention will now be described more fully with reference to the accompanying drawings. The invention may, however, be embodied in many different forms and should not be construed as limited to the embodiments set forth herein.

HVAC systems are frequently utilized to adjust both temperature of conditioned air as well as relative humidity of the conditioned air. A cooling capacity of an HVAC system is a combination of the HVAC system's sensible cooling capacity and latent cooling capacity. Sensible cooling capacity refers to an ability of the HVAC system to remove sensible heat from conditioned air. Latent cooling capacity refers to an ability of the HVAC system to remove latent heat from conditioned air. In a typical embodiment, sensible cooling capacity and latent cooling capacity vary with environmental conditions. Sensible heat refers to heat that, when added to or removed from the conditioned air, results in a temperature change of the conditioned air. Latent heat refers to heat that, when added to or removed from the conditioned air, results in a phase change of, for example, water within the conditioned air. Sensible-to-total ratio ("S/T ratio") is a ratio of sensible heat to total heat (sensible heat+latent heat). The lower the S/T ratio, the higher the latent cooling capacity of the HVAC system for given environmental conditions.

Sensible cooling load refers to an amount of heat that must be removed from the enclosed space to accomplish a desired temperature change of the air within the enclosed space. The sensible cooling load is reflected by a temperature within the enclosed space as read on a dry-bulb thermometer. Latent cooling load refers to an amount of heat that must be removed from the enclosed space to accomplish a desired change in humidity of the air within the enclosed space. The latent cooling load is reflected by a temperature within the enclosed space as read on a wet-bulb thermometer. Setpoint or temperature setpoint refers to a target temperature setting of the HVAC system as set by a user or automatically based on a pre-defined schedule.

When there is a high sensible cooling load such as, for example, when outside-air temperature is significantly warmer than an inside-air temperature setpoint, the HVAC system will continue to operate in an effort to effectively cool and dehumidify the conditioned air. When there is a low sensible cooling load but high relative humidity such as, for example, when the outside air temperature is relatively close to the inside air temperature setpoint, but the outside air is considerably more humid than the inside air, supplemental air dehumidification is often undertaken to avoid occupant discomfort.

An existing approach to air dehumidification involves lowering the temperature setpoint of the HVAC system. This approach causes the HVAC system to operate for longer periods of time than if the temperature setpoint of the HVAC system were set to a higher temperature. This approach serves to reduce both the temperature and humidity of the conditioned air. However, this approach results in over-cooling of the conditioned air, which over-cooling often results in occupant discomfort. Additionally, consequent extended run times cause the HVAC system to consume more energy, which leads to higher utility costs.

Another air dehumidification approach involves re-heating of air leaving an evaporator coil. This approach also results in over-cooling of the conditioned air and results in occupant discomfort.

Figure 1:
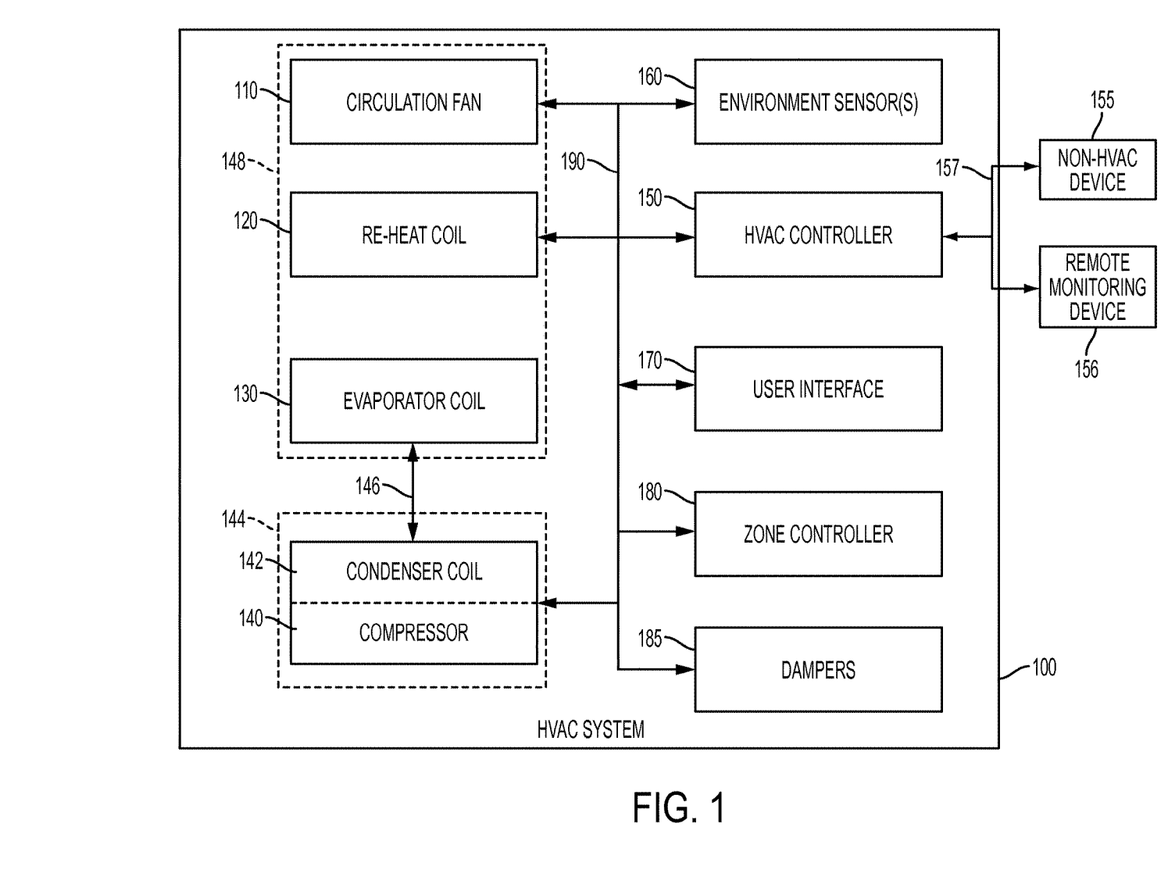
FIG. 1 is a block diagram of an exemplary HVAC system.
Figure 2A:
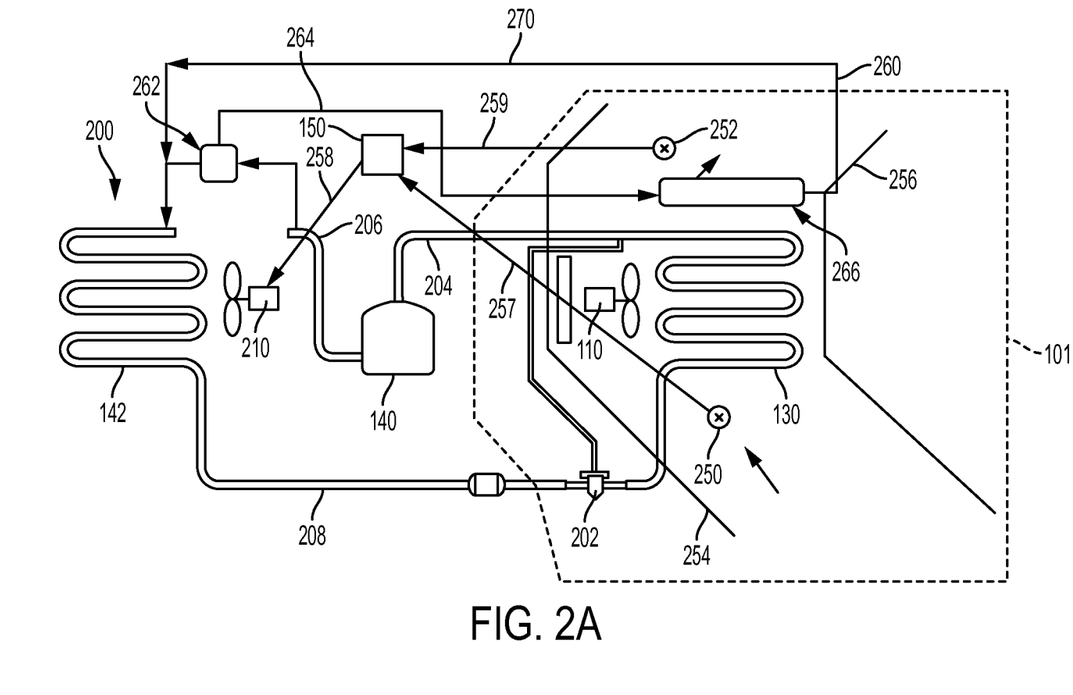
FIG. 2A is a schematic diagram of an exemplary package HVAC system having a re-heat loop.

FIG. 1 illustrates an HVAC system 100. In a typical embodiment, the HVAC system 100 is a networked HVAC system that is configured to condition air via, for example, heating, cooling, humidifying, or dehumidifying air within an enclosed space 101 (shown in FIG. 2). In a typical embodiment, the enclosed space 101 (shown in FIG. 2) is, for example, a house, an office building, a warehouse, and the like. Thus, the HVAC system 100 can be a residential system or a commercial system such as, for example, a roof top system. For exemplary illustration, the HVAC system 100 as illustrated in FIG. 1 includes various components; however, in other embodiments, the HVAC system 100 may include additional components that are not illustrated but typically included within HVAC systems.

The HVAC system 100 includes a circulation fan 110, a re-heat coil 120 associated with the circulation fan 110, typically, and a refrigerant evaporator coil 130, also typically associated with the circulation fan 110. The circulation fan 110, the re-heat coil 120, and the refrigerant evaporator coil 130 are collectively referred to as an "indoor unit" 148. In a typical embodiment, the indoor unit 148 is located within, or in close proximity to, the enclosed space 101 (shown in FIG. 2). The HVAC system 100 also includes a compressor 140 and an associated condenser coil 142, which are typically referred to as an "outdoor unit" 144. In various embodiments, the outdoor unit 144 is, for example, a rooftop unit or a ground-level unit. The compressor 140 and the associated condenser coil 142 are connected to the refrigerant evaporator coil 130 by a refrigerant line 146. In a typical embodiment, the compressor 140 is, for example, a single-stage compressor, a multi-stage compressor, a single-speed compressor, or a variable-speed compressor. The circulation fan 110, sometimes referred to as a blower, is configured to operate at different capacities (i.e., variable motor speeds) to circulate air through the HVAC system 100, whereby the circulated air is conditioned and supplied to the enclosed space 101 (shown in FIG. 2).

Still referring to FIG. 1, the HVAC system 100 includes an HVAC controller 150 that is configured to control operation of the various components of the HVAC system 100 such as, for example, the circulation fan 110, the re-heat coil 120, and the compressor 140 to regulate the environment of the enclosed space 101 (shown in FIG. 2). In some embodiments, the HVAC system 100 can be a zoned system. In such embodiments, the HVAC system 100 includes a zone controller 180, dampers 185, and a plurality of environment sensors 160. In a typical embodiment, the HVAC controller 150 cooperates with the zone controller 180 and the dampers 185 to regulate the environment of the enclosed space 101 (shown in FIG. 2).

The HVAC controller 150 may be an integrated controller or a distributed controller that directs operation of the HVAC system 100. In a typical embodiment, the HVAC controller 150 includes an interface to receive, for example, thermostat calls, temperature setpoints, blower control signals, environmental conditions, and operating mode status for various zones of the HVAC system 100. For example, in a typical embodiment, the environmental conditions may include indoor temperature and relative humidity of the enclosed space 101 (shown in FIG. 2). In a typical embodiment, the HVAC controller 150 also includes a processor and a memory to direct operation of the HVAC system 100 including, for example, a speed of the circulation fan 110.

Still referring to FIG. 1, in some embodiments, the plurality of environment sensors 160 is associated with the HVAC controller 150 and also optionally associated with a user interface. The plurality of environment sensors 160 provide environmental information within a zone or zones of the enclosed space 101 (shown in FIG. 2) such as, for example, temperature and humidity of the enclosed space 101 (shown in FIG. 2) to the HVAC controller 150. The plurality of environment sensors 160 may also send the environmental information to a display of the user interface 170. In some embodiments, the user interface 170 provides additional functions such as, for example, operational, diagnostic, status message display, and a visual interface that allows at least one of an installer, a user, a support entity, and a service provider to perform actions with respect to the HVAC system 100. In some embodiments, the user interface 170 is, for example, a thermostat of the HVAC system 100. In other embodiments, the user interface 170 is associated with at least one sensor of the plurality of environment sensors 160 to determine the environmental condition information and communicate that information to the user. The user interface 170 may also include a display, buttons, a microphone, a speaker, or other components to communicate with the user. Additionally, the user interface 170 may include a processor and memory that is configured to receive user-determined parameters such as, for example, a relative humidity of the enclosed space 101 (shown in FIG. 2), and calculate operational parameters of the HVAC system 100 as disclosed herein.

In a typical embodiment, the HVAC system 100 is configured to communicate with a plurality of devices such as, for example, a monitoring device 156, a communication device 155, and the like. In a typical embodiment, the monitoring device 156 is not part of the HVAC system. For example, the monitoring device 156 is a server or computer of a third party such as, for example, a manufacturer, a support entity, a service provider, and the like. In other embodiments, the monitoring device 156 is located at an office of, for example, the manufacturer, the support entity, the service provider, and the like.

In a typical embodiment, the communication device 155 is a non-HVAC device having a primary function that is not associated with HVAC systems. For example, non-HVAC devices include mobile-computing devices that are configured to interact with the HVAC system 100 to monitor and modify at least some of the operating parameters of the HVAC system 100. Mobile computing devices may be, for example, a personal computer (e.g., desktop or laptop), a tablet computer, a mobile device (e.g., smart phone), and the like. In a typical embodiment, the communication device 155 includes at least one processor, memory and a user interface, such as a display. One skilled in the art will also understand that the communication device 155 disclosed herein includes other components that are typically included in such devices including, for example, a power supply, a communications interface, and the like.

The zone controller 180 is configured to manage movement of conditioned air to designated zones of the enclosed space 101 (shown in FIG. 2). Each of the designated zones include at least one conditioning or demand unit such as, for example, the re-heat coil 120 and the user interface 170 such as, for example, the thermostat. The HVAC system 100 allows the user to independently control the temperature in the designated zones. In a typical embodiment, the zone controller 180 operates dampers 185 to control air flow to the zones of the enclosed space 101 (shown in FIG. 2).

In some embodiments, a data bus 190, which in the illustrated embodiment is a serial bus, couples various components of the HVAC system 100 together such that data is communicated therebetween. In a typical embodiment, the data bus 190 may include, for example, any combination of hardware, software embedded in a computer readable medium, or encoded logic incorporated in hardware or otherwise stored (e.g., firmware) to couple components of the HVAC system 100 to each other. As an example and not by way of limitation, the data bus 190 may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 190 may include any number, type, or configuration of data buses 190, where appropriate. In particular embodiments, one or more data buses 190 (which may each include an address bus and a data bus) may couple the HVAC controller 150 to other components of the HVAC system 100. In other embodiments, connections between various components of the HVAC system 100 are wired. For example, conventional cable and contacts may be used to couple the HVAC controller 150 to the various components. In some embodiments, a wireless connection is employed to provide at least some of the connections between components of the HVAC system such as, for example, a connection between the HVAC controller 150 and the circulation fan 110 or the plurality of environment sensors 160.

FIG. 2A is a schematic diagram of an exemplary package HVAC system 200 having a re-heat loop 260. The HVAC system 200 includes the refrigerant evaporator coil 130, the condenser coil 142, the compressor 140, and a metering device 202. In a typical embodiment, the metering device 202 is, for example, a thermostatic expansion valve or a throttling valve. The refrigerant evaporator coil 130 is fluidly coupled to the compressor 140 via a suction line 204. The compressor 140 is fluidly coupled to the condenser coil 142 via a discharge line 206. The condenser coil 142 is fluidly coupled to the metering device 202 via a liquid line 208.

Still referring to FIG. 2A, during operation, low-pressure, low-temperature refrigerant is circulated through the refrigerant evaporator coil 130. The refrigerant is initially in a liquid/vapor state. In a typical embodiment, the refrigerant is, for example, R-22, R-134a, R-410A, R-744, or any other suitable type of refrigerant as dictated by design requirements. Air from within the enclosed space 101, which is typically warmer than the refrigerant, is circulated around the refrigerant evaporator coil 130 by the circulation fan 110. In a typical embodiment, the refrigerant begins to boil after absorbing heat from the air and changes state to a low-pressure, low-temperature, super-heated vapor refrigerant. Saturated vapor, saturated liquid, and saturated fluid refer to a thermodynamic state where a liquid and its vapor exist in approximate equilibrium with each other. Super-heated fluid and super-heated vapor refer to a thermodynamic state where a vapor is heated above a saturation temperature of the vapor. Sub-cooled fluid and sub-cooled liquid refers to a thermodynamic state where a liquid is cooled below the saturation temperature of the liquid.

The low-pressure, low-temperature, super-heated vapor refrigerant is introduced into the compressor 140 via the suction line 204. In a typical embodiment, the compressor 140 increases the pressure of the low-pressure, low-temperature, super-heated vapor refrigerant and, by operation of the ideal gas law, also increases the temperature of the low-pressure, low-temperature, super-heated vapor refrigerant to form a high-pressure, high-temperature, superheated vapor refrigerant. The high-pressure, high-temperature, superheated vapor refrigerant enters a three-way valve 262 where at least a portion of the high-pressure, high-temperature, superheated vapor refrigerant is diverted into a re-heat feed line 264. The re-heat feed line 264 directs the high-pressure, high-temperature, superheated vapor refrigerant to a re-heat coil 266. In a typical embodiment, the re-heat coil 266 is positioned in a supply duct 256 downwind from the evaporator coil 130. The re-heat coil 266 facilitates transfer of a portion of the heat stored in the high-pressure, high-temperature, superheated vapor refrigerant to air moving through the supply duct 256 thereby heating the air in the supply duct 256. If the high-pressure, high-temperature, superheated vapor refrigerant is warmer, more heat can be transferred to the air in the supply duct 256 thereby causing a temperature of the air in the supply duct 256 to be closer to a temperature of air in a return duct 254. As will be discussed hereinbelow, modulating a speed of the condenser fan 210 changes a temperature of the high-pressure, high-temperature, superheated vapor refrigerant entering the re-heat coil 266 thereby facilitating correction of overcooling. After leaving the re-heat coil 266, the high-pressure, high-temperature, superheated vapor refrigerant travels through a re-heat return line 270 and enters the condenser coil 142.

Outside air is circulated around the condenser coil 142 by a variable-speed condenser fan 210. The outside air is typically cooler than the high-pressure, high-temperature, superheated vapor refrigerant present in the condenser coil 142. Thus, heat is transferred from the high-pressure, high-temperature, superheated vapor refrigerant to the outside air. Removal of heat from the high-pressure, high-temperature, superheated vapor refrigerant causes the high-pressure, high-temperature, superheated vapor refrigerant to condense and change from a vapor state to a high-pressure, high-temperature, sub-cooled liquid state. The high-pressure, high-temperature, sub-cooled liquid refrigerant leaves the condenser coil 142 via the liquid line 208 and enters the metering device 202.

In the metering device 202, the pressure of the high-pressure, high-temperature, sub-cooled liquid refrigerant is abruptly reduced. In various embodiments where the metering device 202 is, for example, a thermostatic expansion valve, the metering device 202 reduces the pressure of the high-pressure, high-temperature, sub-cooled liquid refrigerant by regulating an amount of refrigerant that travels to the refrigerant evaporator coil 130. Abrupt reduction of the pressure of the high-pressure, high-temperature, sub-cooled liquid refrigerant causes sudden, rapid, evaporation of a portion of the high-pressure, high-temperature, sub-cooled liquid refrigerant, commonly known as flash evaporation. The flash evaporation lowers the temperature of the resulting liquid/vapor refrigerant mixture to a temperature lower than a temperature of the air in the enclosed space 101. The liquid/vapor refrigerant mixture leaves the metering device 202 and returns to the refrigerant evaporator coil 130.

Figure 2B:
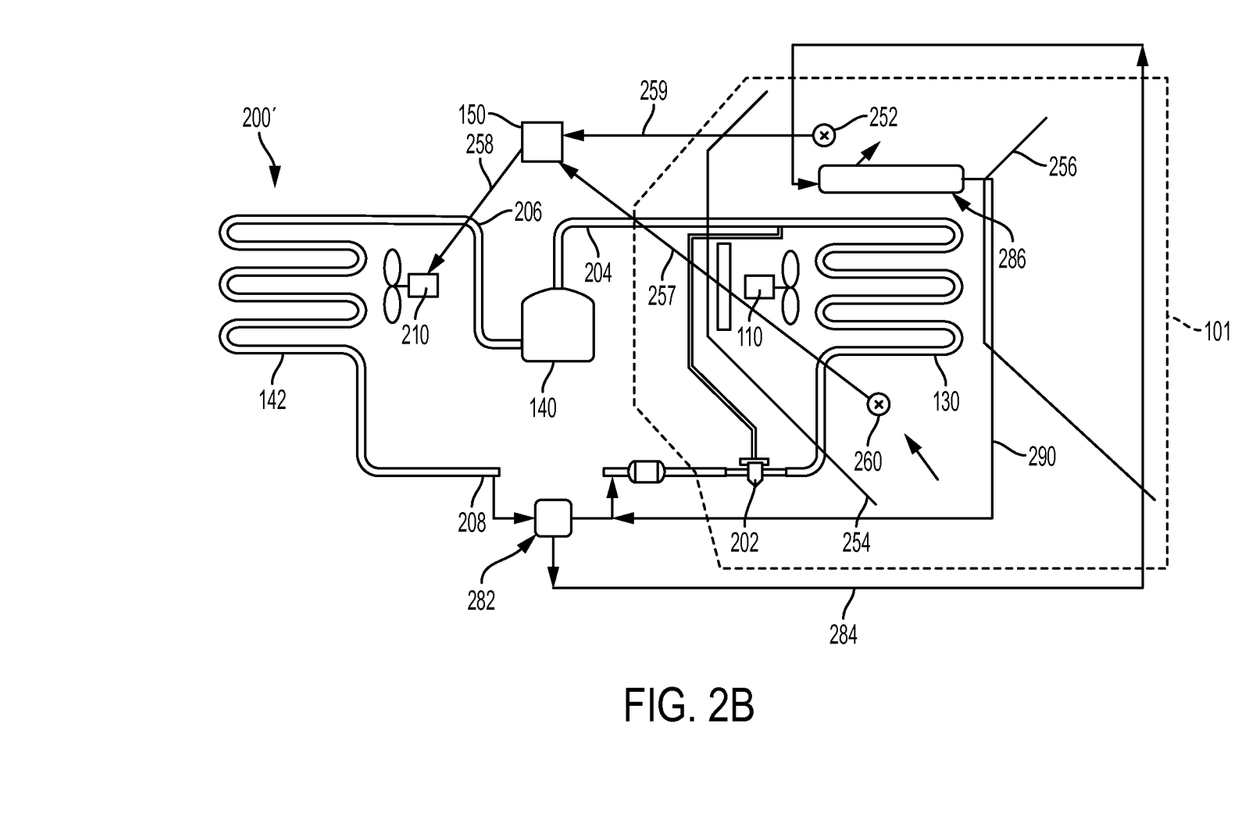
FIG. 2B is a schematic diagram of an exemplary split HVAC system having a re-heat loop.

FIG. 2B is a schematic diagram of an exemplary split HVAC system 200' having a re-heat loop 280. The split HVAC system 200' is similar in operation and construction to the package HVAC system 200. In the split HVAC system 200', the high-pressure, high-temperature, saturated liquid refrigerant leaves the condenser coil 142 via the liquid line 208 and enters a three way valve 282 where a portion of the high-pressure, high-temperature, saturated liquid refrigerant is diverted into a re-heat feed line 284. The re-heat feed line 284 directs the high-pressure, high-temperature, superheated liquid refrigerant to a re-heat coil 286. In a typical embodiment, the re-heat coil 286 is positioned in the supply duct 256 downwind from the evaporator coil 130. The re-heat coil 286 facilitates transfer of a portion of the heat stored in the high-pressure, high-temperature, superheated liquid refrigerant to air moving through the supply duct 256 thereby heating the air in the supply duct 256. If the high-pressure, high-temperature, superheated liquid refrigerant is warmer, more heat can be transferred to the air in the supply duct 256 thereby causing a temperature of the air in the supply duct 256 to be closer to a temperature of air in the return duct 254. As will be discussed hereinbelow, modulating a speed of the condenser fan 210 changes a temperature of the high-pressure, high-temperature, superheated liquid refrigerant entering the re-heat coil 286 thereby facilitating correction of overcooling. After leaving the re-heat coil 286, the high-pressure, high-temperature, superheated vapor refrigerant travels through a re-heat return line 290 and enters the metering device 202.

Referring to FIGS. 2A-2B collectively, in the HVAC system 200, a first temperature sensor 250 is disposed in a return air duct 254 and a second temperature sensor 252 is disposed in a supply air duct 256. In a typical embodiment, the first temperature sensor 250 and the second temperature sensor 252 are, for example, thermistors; however, in other embodiments, the first temperature sensor 250 and the second temperature sensor 252 may be thermocouples, thermometers, or other appropriate devices as dictated by design requirements. The first temperature sensor 250 measures a temperature of air moving through the return air duct 254 and the second temperature sensor 252 measures a temperature of air moving through the supply air duct 256.

The first temperature sensor 250 and the second temperature sensor 252 transmit signals to the HVAC controller 150 corresponding to air temperature values in the return air duct 254 and the supply air duct 256, respectively. The signals transmitted by the first temperature sensor 250 and the second temperature sensor 252 are illustrated by arrows 257 and 259, respectively. The first temperature sensor 250 and the second temperature sensor 252 may communicate with the HVAC controller 150 via, for example, a wired connection or a wireless connection. The HVAC controller 150 determines a difference between the air temperature in the return air duct 254 and the air temperature in the supply air duct 256. In a typical embodiment, the HVAC controller 150 determines the air-temperature difference continuously and determines whether the air-temperature difference is increasing, decreasing, or remaining stable.

If the air-temperature difference is stable, no adjustment is made to the speed of the variable-speed condenser fan 210 and the HVAC controller 150 continues to continuously or periodically calculate the air-temperature difference. However, if a difference between the air temperature in the return air duct 254 and the air temperature in the supply air duct 256 increases, the HVAC controller determines that over-cooling of the conditioned air is occurring. In a typical embodiment, temperature hysteresis could be utilized to prevent undesirable switching between fan speeds. In various embodiments, occurrence of over-cooling is determined by comparing a temperature of the enclosed space 101 to a set-point temperature of a thermostat in the enclosed space 101. In various other embodiments, occurrence of over-cooling is determined by measuring temperature variations over time of air in the supply air duct 256 or of air in the return air duct 254.

Responsive to the determination that over-cooling is occurring, the HVAC controller 150 transmits a signal 258 to the variable-speed condenser fan 210 to reduce a speed of the variable-speed condenser fan 210. The signal 258 may be transmitted via a wired connection or wireless connection. Reducing the speed of the variable-speed condenser fan 210 causes refrigerant entering the re-heat coil 266, 286 to be warmer. Higher refrigerant temperature in the re-heat coil 266, 286 facilitates transfer of additional heat to air in the supply duct 256, which serves to mitigate the over-cooling of the conditioned air in the enclosed space 101. In various embodiments, the HVAC controller 150 transmits a signal to the variable-speed condenser fan 210 to turn off the variable-speed condenser fan 210. In other embodiments, the HVAC controller 150 cycles the variable-speed condenser fan 210 between different speeds or between an operational state and a turned-off state. In a typical embodiment, adjusting the speed of the variable-speed condenser fan 210 maintains the S/T ratio of the HVAC system 200 in a range of approximately −0.1 to approximately 0.1. In a typical embodiment, the S/T ratio is negative in the case of heating. Maintaining the S/T ratio close to zero maximizes the latent capacity of the HVAC system 200 and facilitates air dehumidification without an associated change in air temperature. In a typical embodiment, the speed of the condenser fan 210 may be reduced down to a point where heat is no longer rejected from the condenser coil 142 causing discharge pressure to rise above safe limits.

If a difference between the air temperature in the return air duct 254 and the air temperature in the supply air duct 256 decreases, the HVAC controller determines that over-heating of the conditioned air in the enclosed space 101 is occurring. Responsive to the determination that over-heating is occurring, the HVAC controller 150 transmits a signal 258 to the variable-speed condenser fan 210 to increase the speed of the variable-speed condenser fan 210. The signal 258 may be transmitted via a wired connection or wireless connection. Increasing the speed of the variable-speed condenser fan 210 causes refrigerant entering the re-heat coil 266, 286 to be cooler. Lower refrigerant temperature in the re-heat coil 266, 286 allows transfer of less heat to air in the supply duct 256, which serves to mitigate over-heating of the conditioned air in the enclosed space 101. In a typical embodiment, adjusting the speed of the variable-speed condenser fan 210 maintains the S/T ratio of the HVAC system 200 in the range of approximately −0.1 to approximately 0.1. Maintaining the S/T ratio close to zero maximizes the latent capacity of the HVAC system 200 and facilitates air dehumidification without an associated change in air temperature within the enclosed space 101.

Figure 3:
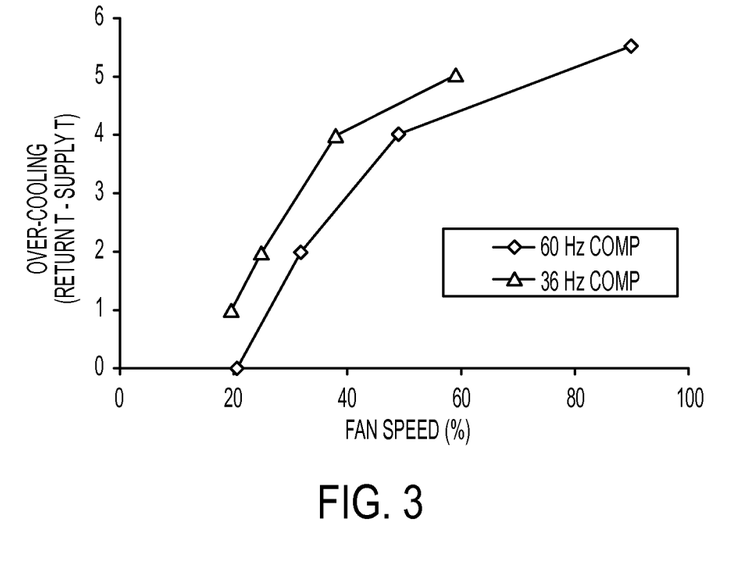
FIG. 3 is a table that illustrates variance of over-cooling with outdoor fan speed.

FIG. 3 is a table that illustrates variance of over-cooling with a speed of the variable-speed condenser fan 210. As illustrated in FIG. 3, when the variable-speed compressor 140 is operating at, for example, 60 Hz, and the speed of the variable-speed condenser fan 210 decreases from, for example, approximately 90% of operation speed to approximately 20% of operation speed, over-cooling decreases from approximately 6 degrees to approximately 0 degrees. If the variable-speed compressor 140 is operating at, for example, 36 Hz, and the speed of the variable-speed condenser fan 210 decreases from, for example, approximately 60% of operating speed to approximately 20% of operating speed, over-cooling decreases from approximately 5 degrees to approximately 1 degree. In a typical embodiment, over-cooling is measured as the difference between the temperature of the air in the return duct and the temperature of the air in the supply duct 256. Reduction of the speed of the condenser fan 210 causes refrigerant entering the re-heat cool (266, 286) to be warmer and capable of absorbing more heat from air in the supply duct 256. Such a scenario reduces over cooling and allows further air dehumidification without over-cooling the air in the enclosed space 101.

Figure 4:
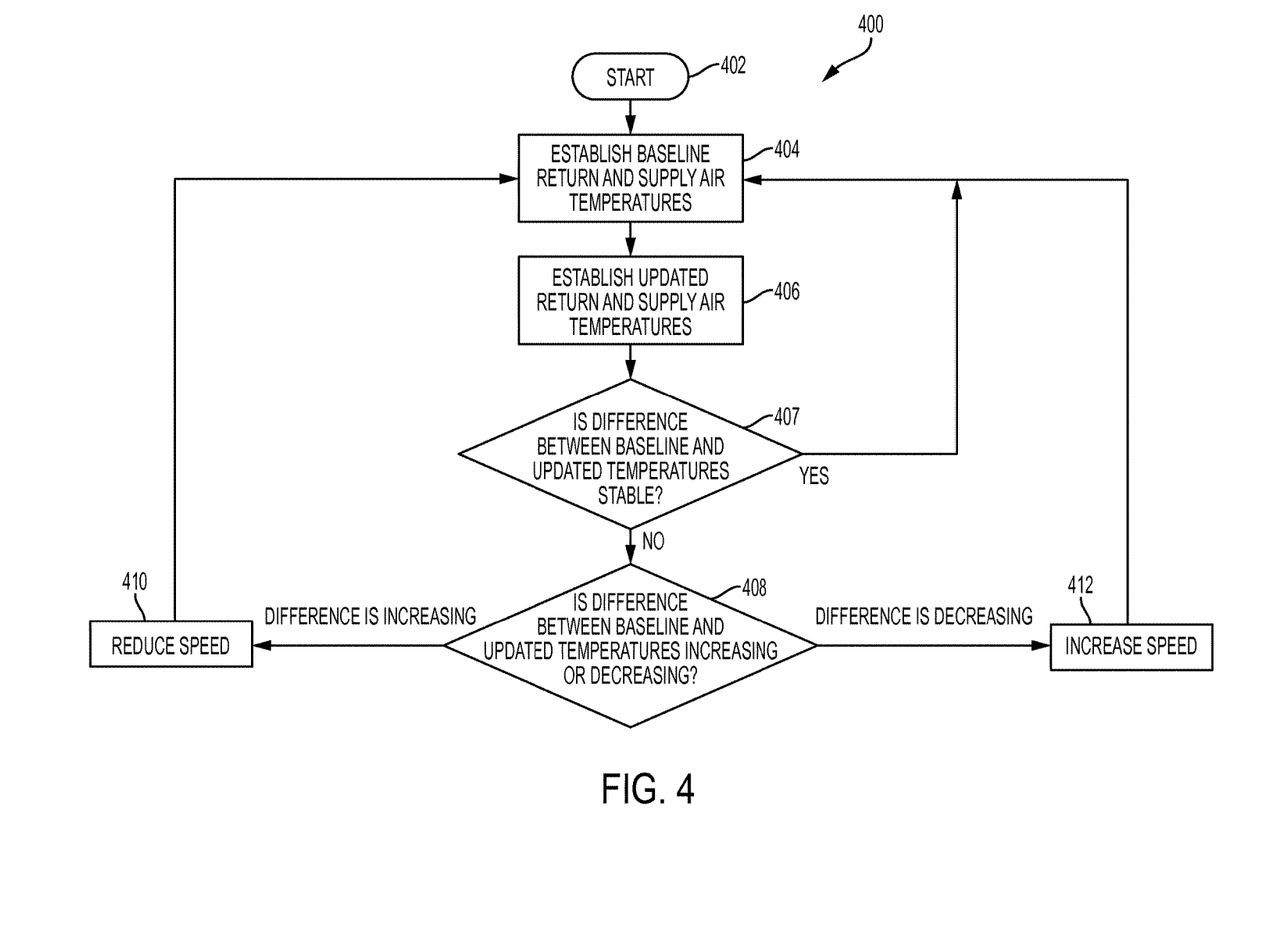
FIG. 4 is a flow chart that shows a process for dehumidifying conditioned air.

FIG. 4 is a flow diagram that illustrates a process 400 for dehumidifying conditioned air. The process 400 begins at step 402. At step 404, a baseline air temperature in the return air duct 254 is measured via the first temperature sensor 250 and a baseline air temperature in the supply air duct 256 is measured via the second temperature sensor 252. Also, at step 404, a signal corresponding to the baseline air temperature in the return air duct 254 is transmitted to the HVAC controller 150 and a signal corresponding to the baseline air temperature in the supply air duct 256 is transmitted to the HVAC controller 150. At step 406, an updated air temperature in the return air duct 254 is measured via the first temperature sensor 250 and an updated air temperature in the supply air duct 256 is measured via the second temperature sensor 252. Also, at step 406, a signal corresponding to the updated air temperature in the return air duct 254 is transmitted to the HVAC controller 150 and a signal corresponding to the updated air temperature in the supply air duct 256 is transmitted to the HVAC controller 150.

At step 407, the HVAC controller 150 compares the baseline air temperature in the return air duct 254 and the baseline air temperature in the supply air duct 256 and calculates a baseline temperature difference. Also, at step 407, the HVAC controller 150 compares the updated air temperature in the return air duct 254 and the updated air temperature in the supply air duct 256 and calculates an updated temperature difference. Also, at step 407, the HVAC controller determines if a difference between the baseline temperature difference and the updated temperature difference has been stable over time. In a typical embodiment, the temperature difference is measured at five-second intervals; however, in other embodiments, any time interval could be utilized as dictated by design requirements such as, for example, less than one second to five minutes or more. If it is determined at step 407 that the difference between the baseline temperature difference and the updated temperature difference remains stable over time, the process 400 returns to step 404. If it is determined at step 407 that the difference between the baseline temperature difference and the updated temperature difference has not remained stable over time, the process proceeds to step 408.

At step 408, the HVAC controller 150 determines whether the difference between the baseline temperature difference and the updated temperature difference has been increasing or decreasing. In a typical embodiment, an increase in the difference between the baseline temperature difference and the updated temperature difference indicates that the HVAC system 200 is over-cooling the conditioned air. In a typical embodiment, the determination of over-cooling is dependent on outdoor-air temperature.

If it is determined at step 408 that the difference between the baseline temperature difference and the updated temperature difference has been increasing, the process 400 proceeds to step 410. At step 410, the HVAC controller 150 transmits a signal 258 to the variable-speed condenser fan 210 to reduce a speed of the variable-speed condenser fan 210. Reduction of the speed of the variable-speed condenser fan 210 serves to mitigate over-cooling by the HVAC system 200, thereby allowing the HVAC system 200 to provide further air dehumidification without an associated change in air temperature. In various embodiments, the HVAC controller 150 transmits a signal to the variable-speed condenser fan 210 to turn off the variable-speed condenser fan 210. In other embodiments, the HVAC controller 150 cycles the variable-speed condenser fan 210 between different speeds or between an operational state and a turned-off state.

If it is determined at step 408 that the difference between the baseline temperature difference and the updated temperature difference has been decreasing, the process 400 proceeds to step 412. At step 412, the HVAC controller 150 transmits a signal 258 to the variable-speed condenser fan 210 to increase a speed of the variable-speed condenser fan 210. Increasing a speed of the variable-speed condenser fan 210 serves to mitigate under cooling by the HVAC system 200. The process 400 then returns to step 404.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. A heating, ventilation, and air conditioning (HVAC) system comprising:
   an indoor unit comprising a return air duct and a supply air duct in an enclosed space;
   an outdoor unit comprising a variable-speed condenser fan;
   a first temperature sensor disposed in the return air duct;
   a second temperature sensor disposed in the supply air duct;
   a controller operatively coupled to the first temperature sensor and the variable-speed condenser fan;
   wherein the controller is configured to:

measure, using the first temperature sensor, an air temperature in the return air duct;
measure, using the second temperature sensor, an air temperature in the supply air duct;
determine a temperature difference between the air temperature in the return air duct and the air temperature in the supply air duct; and
determine whether the temperature difference is increasing, decreasing, or remaining stable;
wherein, responsive to a determination that the temperature difference is increasing, the controller reduces a speed of the variable-speed condenser fan; and
wherein responsive to a determination that the temperature difference is decreasing, the controller increases the speed of the variable-speed condenser fan.

2. The system of claim 1, wherein the controller is configured to detect humidity of air in the enclosed space.

3. The system of claim 1, wherein the controller is configured to decrease a speed of the variable-speed condenser fan responsive to a determination that over-cooling occurs.

4. The system of claim 3, wherein decreasing the speed of the variable-speed condenser fan reduces over-cooling by the HVAC system.

5. The system of claim 1, wherein the controller is configured to increase a speed of the variable-speed condenser fan responsive to a determination that over-heating occurs.

6. The system of claim 5, wherein increasing the speed of the variable-speed condenser fan reduces over-heating by the HVAC system.

7. The system of claim 1, wherein:
adjustment of the speed of the variable-speed condenser fan maintains an S/T ratio of the HVAC system in a range of approximately −0.1 to approximately 0.1; and
the S/T ratio is a ratio of sensible heat removed from the enclosed space to total heat removed from the enclosed space.

8. A method comprising:
receiving, by a controller associated with a heating, ventilation, and air conditioning (HVAC) system, an air temperature in a return air duct and an air temperature in a supply air duct;
determining, via the controller, a temperature difference between the air temperature in the return air duct and the air temperature in the supply air duct;
determining, via the controller, if the temperature difference is increasing, decreasing, or remaining stable;
responsive to a determination that the temperature difference is increasing, reducing, via the controller, a speed of a variable-speed condenser fan of the HVAC system; and
responsive to a determination that the temperature difference is decreasing, increasing, via the controller, the speed of the variable-speed condenser fan.

9. The method of claim 8, wherein the determination that the temperature difference is increasing is indicative of over-cooling.

10. The method of claim 9, wherein the reducing the speed of the variable-speed condenser fan corrects over-cooling by the HVAC system.

11. The method of claim 8, wherein the determination that the temperature difference is decreasing is indicative of over-heating.

12. The method of claim 11, wherein the increasing the speed of the variable-speed condenser fan corrects over-heating by the HVAC system.

13. The method of claim 8, comprising maintaining an S/T ratio of the HVAC system in a range of approximately −0.1 to approximately 0.1, wherein the S/T ratio is a ratio of sensible heat removed from an enclosed space to total heat removed from the enclosed space.

14. The method of claim 13, wherein the maintaining maximizes a latent capacity of the HVAC system.

15. The method of claim 13, wherein the maintaining facilitates air dehumidification without an associated change of temperature of conditioned air.

16. A heating, ventilation, and air conditioning (HVAC) system comprising:
an indoor unit comprising a return air duct and a supply air duct in an enclosed space;
an outdoor unit comprising a variable-speed condenser fan;
a first temperature sensor disposed in the return air duct;
a second temperature sensor disposed in the supply air duct;
a controller operatively coupled to the first temperature sensor, the second temperature sensor, and the variable-speed condenser fan;
wherein the controller is configured to:
measure, using the first temperature sensor, an air temperature in the return air duct;
measure, using the second temperature sensor, an air temperature in the supply air duct;
determine a temperature difference between the air temperature in the return air duct and the air temperature in the supply air duct; and
determine whether the temperature difference is increasing, decreasing, or remaining stable;
wherein, responsive to a determination that the temperature difference is increasing, the controller reduces a speed of the variable-speed condenser fan; and
wherein responsive to a determination that the temperature difference is decreasing, the controller increases the speed of the variable-speed condenser fan;
wherein adjustment of the speed of the variable-speed condenser fan maintains an S/T ratio of the HVAC system in a range of approximately −0.1 to approximately 0.1; and
wherein the S/T ratio is a ratio of sensible heat removed from the enclosed space to total heat removed from the enclosed space.

* * * * *